June 25, 1957 C. G. JOHNSON 2,797,048

POPULARITY METERS FOR AUTOMATIC PHONOGRAPHS

Filed March 31, 1951 5 Sheets-Sheet 1

Inventor
Carl G. Johnson
By John F. Eakins
Attorney

June 25, 1957 C. G. JOHNSON 2,797,048

POPULARITY METERS FOR AUTOMATIC PHONOGRAPHS

Filed March 31, 1951 5 Sheets-Sheet 2

Inventor
Carl G. Johnson
By John F. Eakins
Attorney

June 25, 1957 C. G. JOHNSON 2,797,048

POPULARITY METERS FOR AUTOMATIC PHONOGRAPHS

Filed March 31, 1951 5 Sheets-Sheet 3

Inventor
Carl G. Johnson
By John F. Eakins
Attorney

June 25, 1957 C. G. JOHNSON 2,797,048

POPULARITY METERS FOR AUTOMATIC PHONOGRAPHS

Filed March 31, 1951 5 Sheets-Sheet 4

Inventor
Carl G. Johnson
By John F. Eakins
Attorney

POPULARITY METERS FOR AUTOMATIC PHONOGRAPHS

Filed March 31, 1951 5 Sheets-Sheet 5

Inventor
Carl G. Johnson
By John F. Eakins
Attorney

United States Patent Office 2,797,048

Patented June 25, 1957

2,797,048

POPULARITY METERS FOR AUTOMATIC PHONOGRAPHS

Carl G. Johnson, Chicago, Ill., assignor, by mesne assignments, to Fort Pitt Industries, Incorporated, Pittsburgh, Pa., a corporation of Pennsylvania Application March 31, 1951, Serial No. 218,641

9 Claims. (Cl. 235—91)

This invention relates to popularity meters for automatic phonographs, and has for its principal object to provide an improved meter for the purpose of indicating what records receive a substantial patronage.

Meters of this type heretofore used have provided a disc or wheel for each record in the machine. Usually, the discs were in the form of ratchets and a detent was normally provided for each ratchet to prevent undesired reverse movement. Another detent was arranged to cooperate with any one of the ratchets to step it forward one tooth. This last mentioned detent was associated with the selecting mechanism so that it thus actuated the disc corresponding to a record being played. Stops were provided to limit the disc to approximately one rotation. To set the discs to zero position, necessitated means for disengaging the individual detents of all the discs, whereupon all the discs could be rotated to their zero position in contact with the stops.

With phonographs which provide a large number of records, for example 50 records, the duplication of parts results in a complicated and expensive mechanism.

In accordance with the present invention, I provide a disc for each record, and I mount these discs in such manner that they do not require individual detents to maintain them in actuated position. I provide a member which engages each disc and effects its displacement through a definite small angle when the coresponding record is about to be played. I frictionally mount the discs on a shaft and I provide a brake for holding the shaft in any position into which it is actuated. This brake is preferably effective to permit the shaft to be rotated to carry all the discs back to their initial position in engagement with individual stops and is preferably arranged so that the shaft cannot be rotated in the opposite direction. When a certain record is about to be played, the disc actuating means is in register with the corresponding disc and this actuating means is rendered operative so as to move this disc one step in said reverse direction. The fact that this invention renders unnecessary detent means, individual to each disc, and the mechanism heretofore necessary for disengaging these individual detents, results in the provision of a popularity meter of great simplicity.

The present invention is described in relation to a phonograph of the type described and claimed in Reissue Patent No. 22,551, issued October 3, 1944, to Edward F. Andrews. This type of phonograph provides a magazine having spaces for the reception of records in vertical position. A playing unit moves along the magazine and is arrested in selecting position so that any one of the records may be played and returned to the magazine. The disc actuating means is carried by the player unit and the disc assembly is located, preferably on the magazine, in parallel relation to the direction of movement of the playing unit. The discs have the same spacing as the record spaces in the magazine and the arrangement is such that when the playing unit stops to play a record, the disc actuating means is in register with the corresponding disc. It must be understood that it is not intended to limit the invention to this particular type of phonograph, because in all automatic phonographs provided with popularity meters, some element moves to a position which is individual to the particular record selected.

The invention will readily be understood from the following description of a preferred embodiment thereof, taken in conjunction with the accompanying drawings, in which.

Figure 1:
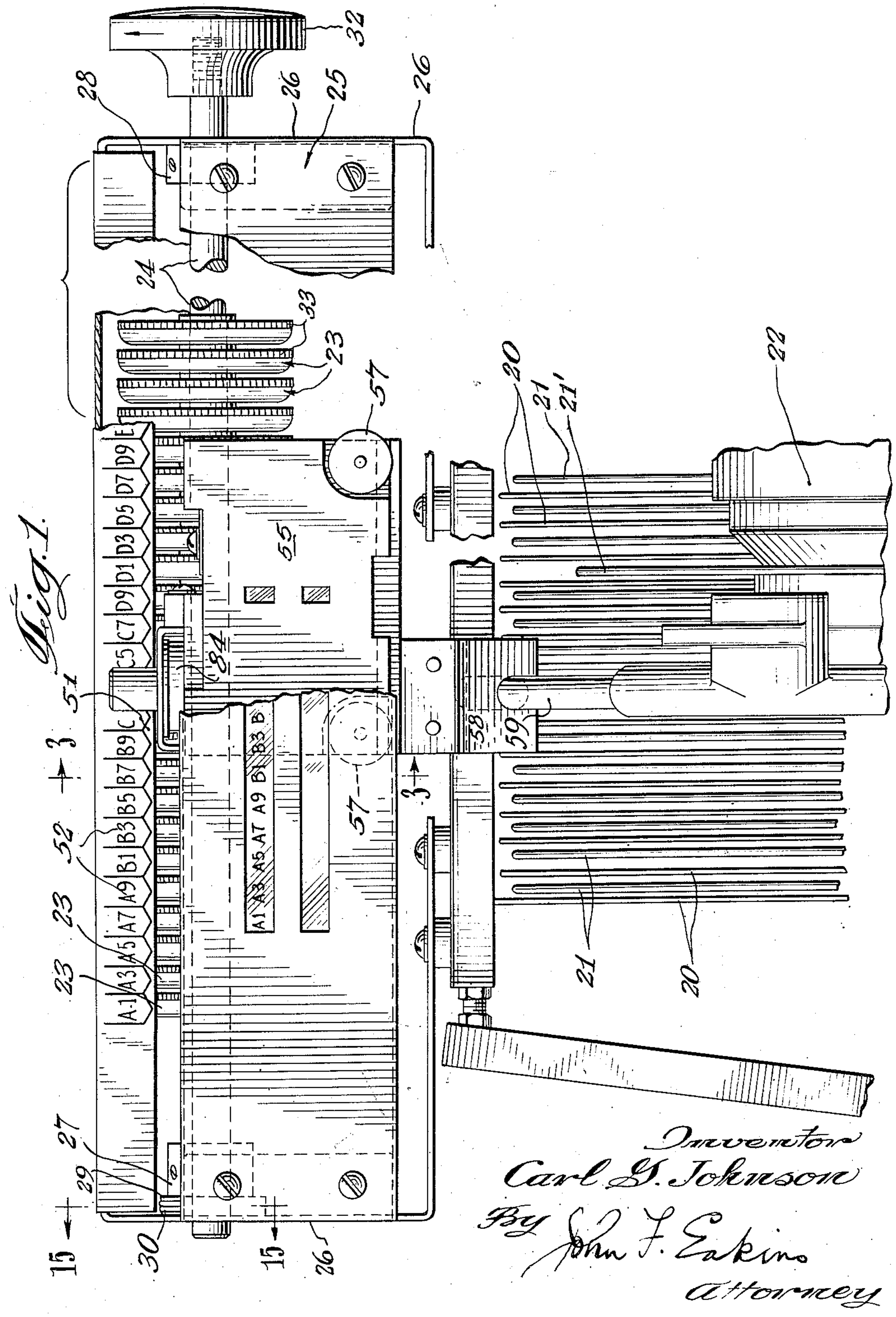
Figure 1 is a fragmentary front elevational view of a phonograph embodying my invention.

Referring to the drawings, and particularly to Figure 1, the reference numeral 20 designates the magazine spacers which provide storage spaces for records 21. The reference numeral 22 designates the playing unit with traverses in front of the magazine. The twelfth record 21′ is being played by the playing unit. The discs 23 are mounted on a shaft 24 which is rotatably mounted in a frame 25 mounted above the magazine. The shaft is mounted in end members 26 of the frame 25 and is held against axial movement by means of collars 27 and 28 rigidly secured to the shaft 24 and located in abutting relation to the end members 26. The collar 27 is provided with a grooved enlargement 29, the groove of which receives a spiral spring 30. One end of the spring is received in an opening in a lug 31 on the adjacent end member 26 and the spring extends from this end in the counterclockwise direction as viewed from the right. The right hand end of the shaft is provided with a handle 32 whereby the shaft may be rotated in the clockwise direction as viewed from the right. Rotation in this direction is permitted because it tends to loosen the spring 30, as will be best understood from Fig. 15. If the serviceman tries to rotate the shaft in the opposite direction, that is, the counterclockwise direction, the cooperation between the collar 27 and the spring 30 is a snubbing one which prevents rotation in the counterclockwise direction. It may here be noted that the individual discs 23 are actuated in the counterclockwise direction and are brought to zero position by rotation of the shaft 24 in the clockwise direction.

Figures 2, 14:
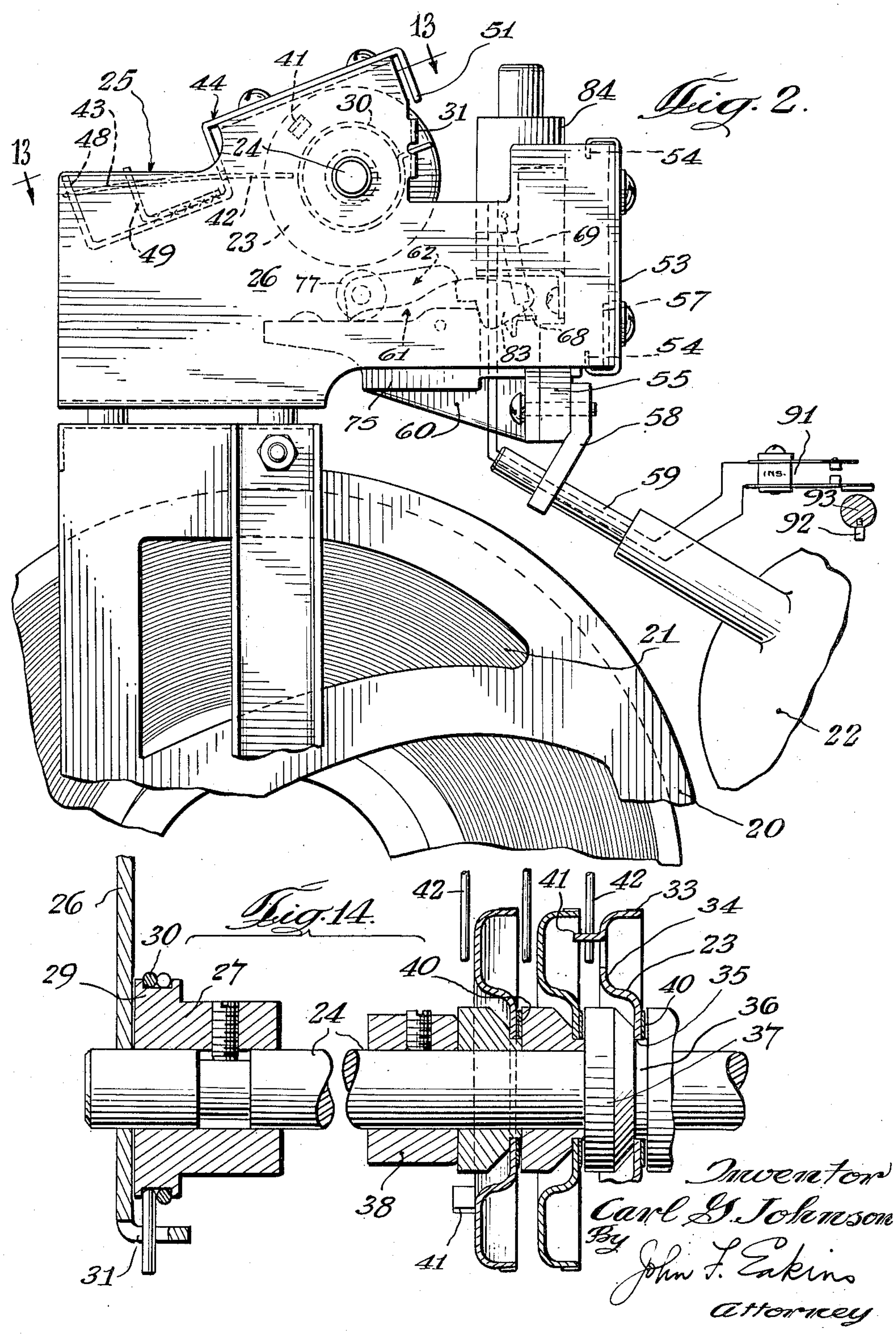
Fig. 2 is a fragmentary side elevation theerof.
Fig. 14 is a fragmentary plan view taken on the line 14—14 of Fig. 3, showing the manner in which the discs are mounted on their shaft and showing the brake for the shaft.
Figures 3, 15:
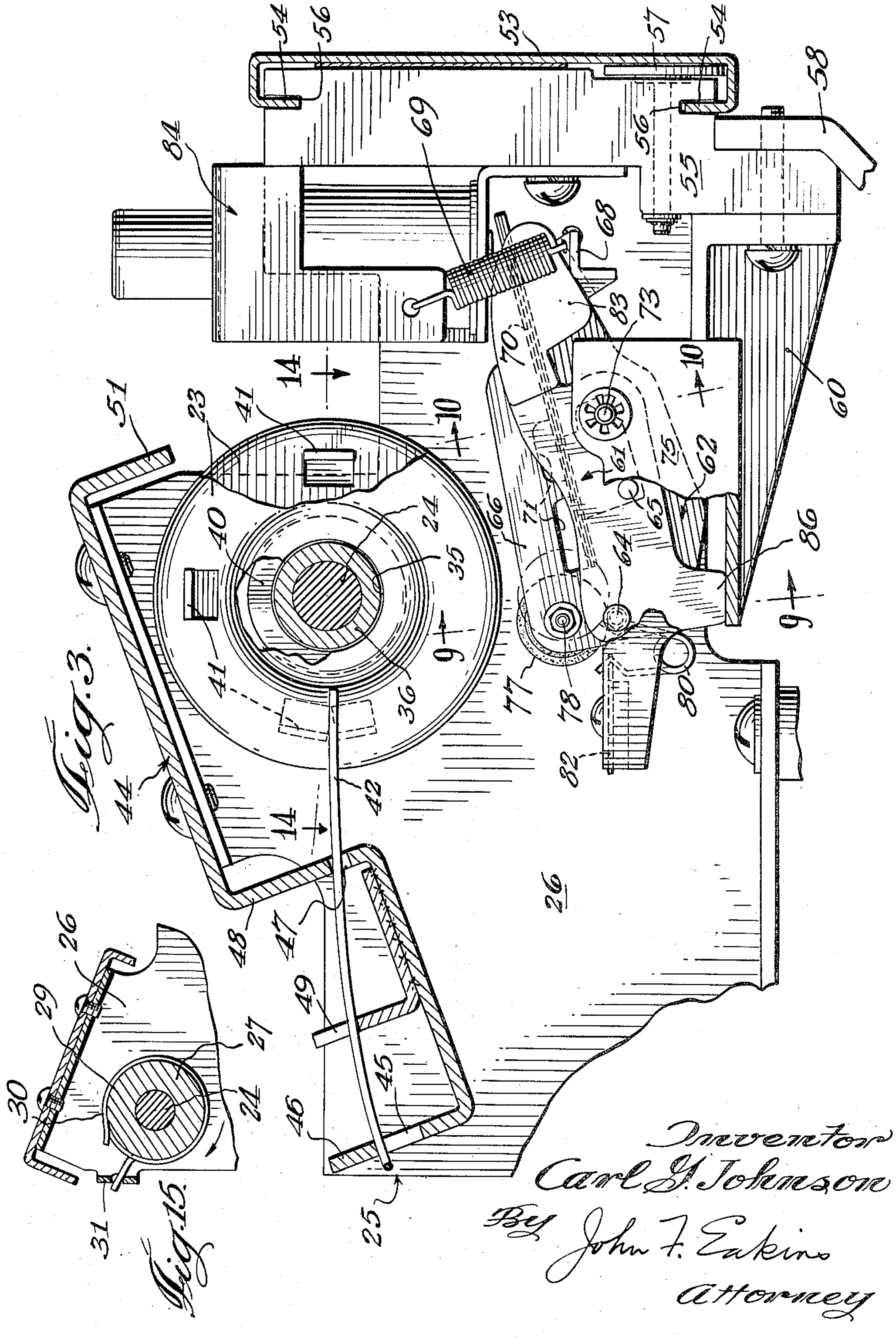
Fig. 3 is a fragmentary sectional view viewed as in Fig. 2, the section being taken on the line 3—3 of Fig. 1.
Fig. 15 is a fragmentary sectional elevational view taken on the line 15—15 of Fig. 1, showing the manner in which the brake is mounted.
Figure 13:
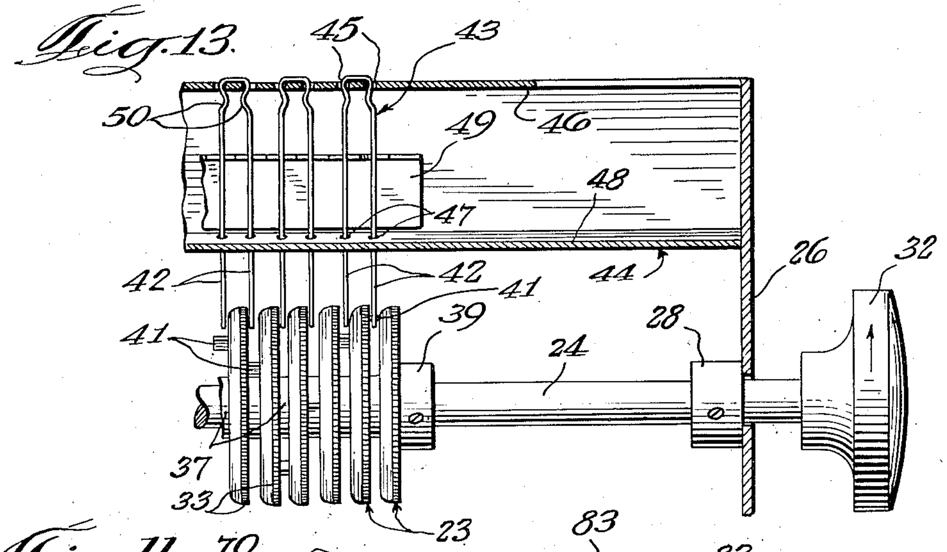
Fig. 13 is a sectional plan view taken on the line 13—13 of Fig. 2, showing the manner in which the disc stops are mounted.
Figure 11:
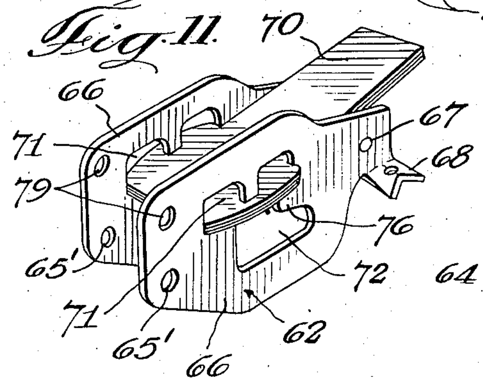
Figs. 11 and 12 are perspective views of the two frames of the disc actuating means.
Figure 12:
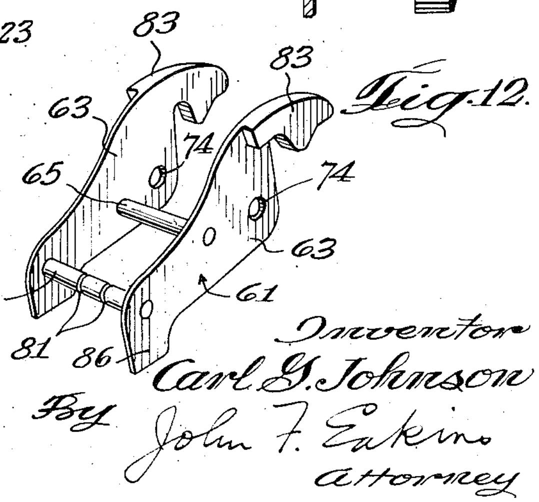

As best seen in Fig. 14, each disc 23 may suitably be a stamping, formed to provide a peripheral edge 33 extending in the axial direction. This edge is knurled to insure good frictional engagement with the actuating member. The edge 33 is suitably provided by a circular dish formation 34 so that the disc is quite strong although it may be formed from light metal. Each disc is provided with a central opening 35, for the reception of a reduced portion 36 of an individual collar 37. The individual collars are rigidly mounted on the shaft 24 by means of collars 38 and 39. The reduced portion 36 of the collar 37 is wider than the stock of the disc 23 and a spring washer 40 is located betwen each disc and the next collar. Thus, the collars 37 are held rigid on the shaft 24 and each disc 23 is held with light friction on the shaft 24. Each disc 23 has a lug 41 struck outwardly to serve as a stop in cooperation with a stop 42. A stop 42 is provided for each disc. As best shown in Fig. 13, a spring rod 43 of general hairpin form, may provide two stops 42 for two adjacent discs 23. The hairpin structures 43 are carried by a double channel bridge piece 44, which extends between and above the end members 26. The hairpin structure 43 is introduced through two openings 45 in the rear wall 46 of the bridge piece 44 and through openings 47 in the intermediate wall 48 of the bridge piece 44. Between the two walls 46 and 48, the legs of the member 43 are supported within slots on an L-member 49, secured within the rear channel of the bridge piece 44. The arrangement is such that the legs of the member 43 are bowed upwardly between the walls 46 and 48, as best shown in Fig. 3. The forward ends or stops 42 project forwardly, each into the path of one of the lugs 41. The hairpin structures 43 are provided with indentations 50 adjacent their U-bend which serve to anchor them to the wall 46 and prevent accidental displacement.

The shaft 24 is normally held stationary by the brake or clutch spring 30. It can be rotated by its handle 32 in the clockwise direction, as viewed from the right in Fig. 1 and as shown in Fig. 15, since rotation in this directon loosens the clutch spring 30. When the shaft 24 is thus rotated every displaced disc 23 is carried with it owing to the individual light friction provided between the shaft 24 and each disc 23 by the individual associated spring washer 40. Thus every disc 23 is returned to its zero position by a single clockwise rotation of the handle 32. Each disc 23 is arrested in its zero position by engagement of its stop 41 with its associated stop 42. After a disc has thus been brought into its zero position continued rotation of the handle 32 in the clockwise direction has no effect upon it, the force applied to the handle merely causing the shaft to rotate relatively to the arrested disc. It may also be remarked that when any disc is stepped in the opposite registering direction, through approximately a complete revolution, its lug 41 engages the other side of its stop 42 and arrests the disc. When the actuating element again displaces the disc, the resilient stop 42 is merely deflected and when the actuating element clears the disc, the latter is formed slightly to its fully displaced position. As shown in Figs. 5 to 8, the peripheral edge 33 of each disc is provided with numbers to indicate the position of the disc and preferably the initial zone of the disc, for example, between 0 and 10 is colored. When the disc is in normal position, the indicia 0 is slightly in advance of the forward depending lip 51 of the bridge piece 44. Consequently, the serviceman can see at a glance which records have received very little play, which probably indicates that the record is due for replacement by a more popular record. The lip 51 is provided with indicia 52 in register with each disc 23 so that the corresponding record can readily be identified.

The frame 25 carries a longitudinal channel member 53, having inturned edges 54 which serve as slides for a block 55 which carries the actuating member. This block is provided with longitudinal slots 56 which receive the inturned edges 54 so that the block may slide along the member 53. The block 55 is preferably provided with rollers 57 which rest on the lower channel of the member 53. The block 55 carries a depending bracket 58. This bracket is provided with an opening through which extends a post 59 carried by the framework of the playing unit 22. Consequently, the block 55 is moved by the playing unit so that the actuating member is brought into register with the disc 23 corresponding to the record at the playing position.

The actuating unit is mounted on a bracket 60, secured to the block 55. This unit comprises two frames 61 and 62. The frame 61 comprises two similar side members 63, which are assembled together by rivets 64 and 65. It may be stated that the units are assembled with the frame 62 within the side walls 63, the rivet 64 extending through the openings 65′ of the frame 62, pivotally connecting the two frames together. The frame 62 comprises two parallel side members 66 which are assembled together by means of a rivet 67. Each side member 66 is provided with an outwardly directed perforated lug 68 for attachment to the springs 69. The frame 62 carries a forwardly directed flat spring 70. The rear end of this spring is enlarged and is seated in openings 71 in the side members 66. The side members 66 are also provided with an opening 72 within which the rivet 65 is received and also the pin 73, which extends through the openings 74 in the side members 63 of the frame 61. The pin 73 is secured in openings in walls 75, carried by the bracket 60, the pin 73 thus mounting the frame 61 pivotally on the bracket 60. The opening 72 provides for movement of the frame 62 without engagement of the rivet 65. The movement of the frame 62, relative to the frame 61, is limited by the engagement of the pivot pin 73 with the abutment of the opening 72 and with an overhanging shoulder 76 on each side wall 66 of the frame 62. The actuating element may suitably be a block 77 of resilient material, suitably rubber, which is rigidly mounted on the frame 62 by means of a bolt 78, which extends through the opening 79 at the rear top corner of the side member 66. The block 77 is preferably round so that in case of wear, the bolt 78 may be loosened and the block 77 rotated slightly to present a new surface to engage the periphery 33 of the disc 23.

Figure 4:
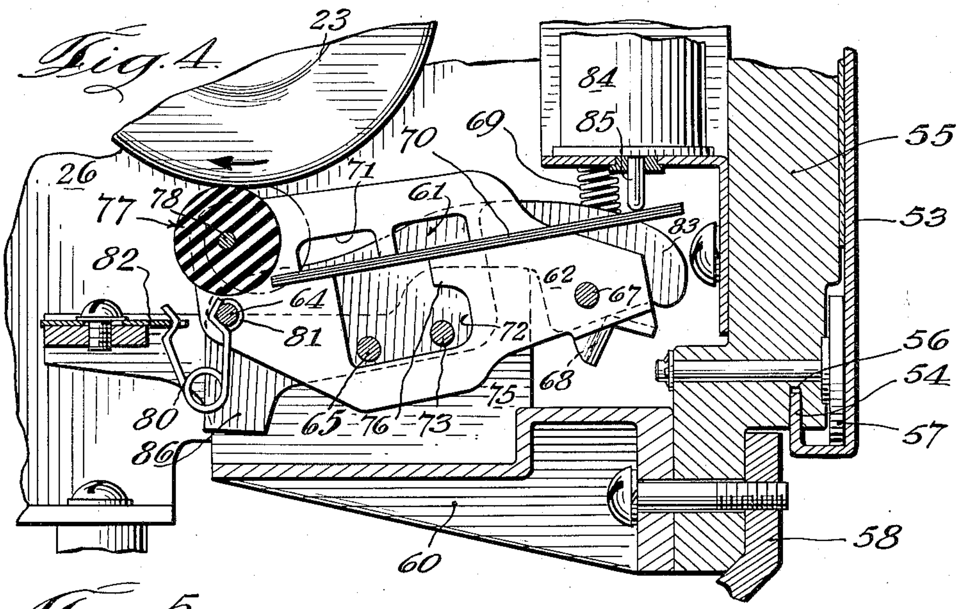
Fig. 4 is a fragmentary view similar to Fig. 3, showing the disc actuating means in section and illustrating the manner in which it cooperates with an individual disc.
Figure 5:
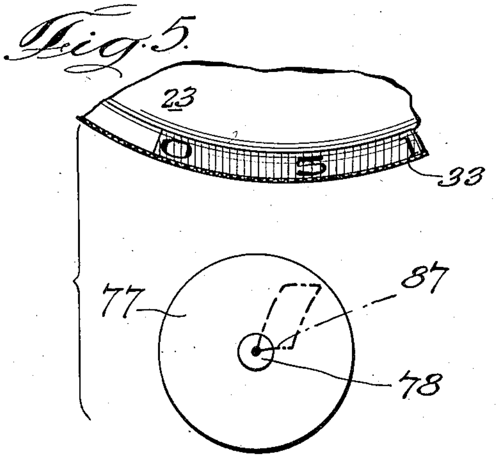
Figs. 5, 6, 7 and 8, are diagrammatic views illustrating consecutive steps of the cooperation between the disc actuating means and a disc.

An over-center spring 80 is provided for the frame 61. This spring may suitably be formed from a single piece of wire providing two registering coils, a loop and two hooked ends. The two hooked ends engage recesses 81 in the rivet 64 and the loop end is engaged in recesses on the edge of a plate 82, carried on the bracket 60, as best seen in Fig. 4. The plate 82, the main pivot 73 and the pin 64 are so located that the spring 80 applies a slight force on the frame 61 in the counterclockwise direction when the frames are in their normal position, as viewed in Fig. 3. When, however, the frame 61 is swung about its pivot 73, in the clockwise direction, into its position in Fig. 4, the rivet 64 is swung upwardly above the line between the plate 82 and the pivot 73 so that the spring 80 applies a relatively weak force, tending to keep the frame 61 in this position. It may here be noted that the spring 80 may be relatively weak and it is preferred to balance the frame 61 about its pivot 73, for which purpose, weights 83 are provided on the forward ends of the side members 63. It may be noted that the weights 83 overlie the lugs 68 and serve to limit the relative movement between the two frames, in one direction.

A solenoid 84 is mounted on the block 55 and is arranged with its plunger 85 in alignment with the leaf spring 70. The upper ends of the springs 69 are attached to the frame of the solenoid.

Figure 6:
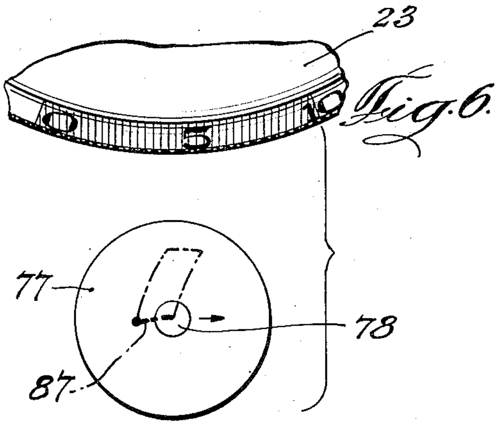
Figure 7:
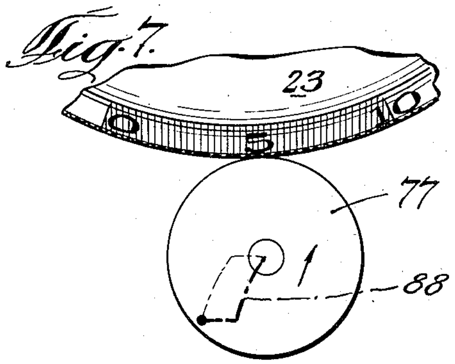
Figure 8:
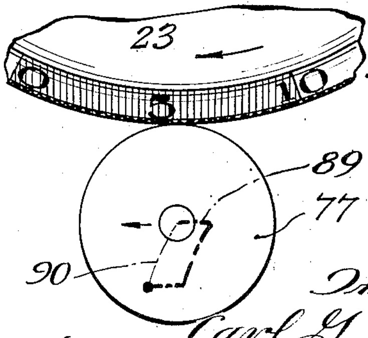
Figure 9:
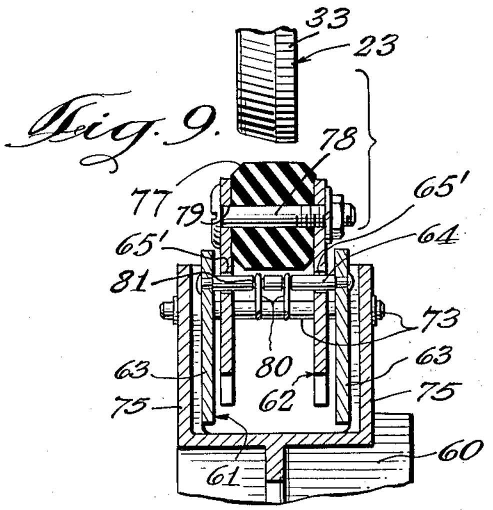
Fig. 9 is a sectional detail view of the disc actuating means taken on the line 9—9 of Fig. 3.
Figure 10:
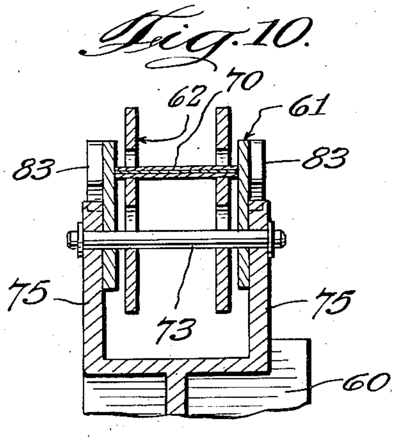
Fig. 10 is a fragmentary sectional view of the disc actuating means, the section being taken on the line 10—10 of Fig. 3.

In normal condition, the two frames are in the position shown in Fig. 3, the solenoid being deenergized, the springs 69 have swung both frames in counterclockwise direction until the abutment 86 of the frame 61 engages the bracket 60. The frame 62 is held in the position of Fig. 3 by engagement of its lugs 68 with the weights 83 or by engagement of the lower edge of the openings 72 with the main pivot 73. The location of the disc 23, the disc actuating element 77 and its central bolt 78, now existing, is shown diagrammatically and on a larger scale in Fig. 5. When the solenoid 84 is energized, its plunger 85 is projected downwardly and owing to its engagement with the spring 70 carried by the frame 62, the frame 62 is swung in clockwise direction, as viewed in Fig. 3. This swinging of the frame 62 occurs about two pivots. The first movement is about the axis provided by the rivet 64, the frame 61 being held in its position of Fig. 3 by the over-center spring 80. When, however, the frame 62 is moved independently of the frame 61, until the shoulder 76 engages the main pivot 73, independent movement of the frame 62 in the clockwise direction, is no longer possible, and the latter part of the actuation effected by the solenoid 84, causes both frames to swing together in the clockwise direction. During the first part of solenoid actuation, the actuating element 77 moves forwardly or to the right as shown in Fig. 6, the movement of the center being along the arc 87. In the latter part of the solenoid actuation, that is, after the shoulder 76 engages the main pivot 73, the actuating element is brought into engagement with the edge of the disc 23, as shown in Fig. 7, the movement of the center being along the arc 88. This position of the roller 77 is also shown in phantom in Fig. 4. It is to be noted that as a result of the clockwise swinging of the frame 61, the spring 80 is now effective, tending to hold the frame 61 in its displaced position of Fig. 4.

It will be understood that the solenoid is energized momentarily and its deenergization effects return movement of the frame 62 in two stages. In the first part of the return movement, the frame 62 rotates in the counterclockwise direction under the influence of the springs 69 and the actuating element 77 being in engagement with the disc 23, this disc is rotated one step in the clockwise direction, as viewed in Fig. 4. During this first movement of the frame 62, the center of the actuating element 77 moves on the arc 89. The independent movement of the frame 62 is terminated by engagement of the lugs 68 with the weights 83 or engagement with the lower edges of the openings 72 of the main pivot 73. When either of these engagements occur, both frames rotate about the main pivot 73, the center of the actuating member moving downwardly along the arc 90.

It will readily be understood from a consideration of Figs. 5 to 8, that owing to the independent movements of the frame 62, and the joint movements of the frames 61 and 62, the actuating element 77 executes a generally parallelogram path and while it is moving along the path illustrated by the upper side of this parallelogram, that is, along the arc 89, it is in engagement with the corresponding disc 23 to effect a registering displacement thereof.

It will be understood that when a record is played a number of times, the corresponding disc 23 has received a corresponding number of actuations so that the popularity of the corresponding record can readily be observed. The meter is set back to zero by rotating the handle 32 in clockwise direction. The discs 23 being each individually frictionally mounted on the shaft 24, a single complete revolution of the shaft is sufficient to turn all the discs in clockwise direction until each disc is arrested in zero position with its lug 41 in engagement with its stop 42.

The solenoid 84 is energized once during each time the playing unit goes through its cycle to reproduce a record. For example, it may be energized by the momentary closing of a switch 91. This switch may be closed once during each record playing cycle by means of a projection 92 carried by the main cam shaft 93 of the player unit. The switch 91 is located in the circuit of the solenoid 84 and the connecting leads therefore may extend through the post 59 which is made hollow for this purpose.

Although the invention has been described in connection with the specific details of a preferred embodiment thereof, it must be understood that such details are not intended to be limitative of the invention except insofar as set forth in the accompanying claims.

Having thus described my invention, I declare that what I claim is:

1. A popularity meter for phonographs comprising a shaft, means for normally holding said shaft against rotation, a plurality of registering discs, each rotatably mounted on said shaft, friction means individual to each disc providing friction exclusively between said disc and shaft, means on said shaft maintaining each disc out of frictional contact with adjacent discs, an actuating member arranged to be brought into selecting position in alignment with each disc, and means for moving said member in a path in the form of a closed figure during a part only of which it frictionally engages the aligned disc while moving in one direction to effect a registering displacement thereof.

2. A popularity meter for phonographs comprising a shaft, means for normally holding said shaft against rotation, a plurality of registering discs, each rotatably mounted on said shaft, friction means individual to each disc providing friction exclusively between said disc and shaft, means on said shaft maintaining each disc out of frictional contact with adjacent discs, an actuating member arranged to be brought into selecting position in alignment with each disc, means for moving said member in a path in the form of a closed figure during a part only of which it frictionally engages the aligned disc while moving in one direction to effect a registering displacement thereof, stop means for each disc, and means for rotating said shaft and the frictionally carried discs in reverse direction to effect return of the discs to initial positions defined by said stop means as a result of the individual friction between each disc and the shaft.

3. A popularity meter for phonographs comprising a shaft, means for normally holding said shaft against rotation, a plurality of registering discs, each rotatably mounted on said shaft, independent individual friction means associated with each disc for providing friction for the disc exclusively with the shaft, means on said shaft maintaining each disc out of frictional contact with adjacent discs, an actuating member arranged to be brought into selecting position in alignment with each disc, means for moving said member in a path in the form of a closed figure during a part only of which it frictionally engages the aligned disc while moving in one direction only, to effect a registering displacement thereof, stop means for each disc, and means for rotating said shaft and the frictionally carried discs in reverse direction to effect return of the discs to initial positions defined by said stop means, said stop means being resilient to permit a slight oscillatory movement of the disc when it is actuated after its full registering displacement.

4. A popularity meter for phonographs comprising a shaft, a brake for preventing movement of the shaft in registering direction and permitting forcible movement thereof in the opposite direction, a plurality of registering discs, each rotatably mounted on said shaft, independent individual friction means associated with each disc for providing friction for the disc exclusively with the shaft, means on said shaft maintaining each disc out of frictional contact with adjacent discs, an actuating member arranged to be brought into selecting position in alignment with each disc, and means for moving said member in a path in the form of a closed figure during a part only of which it frictionally engages the aligned disc while moving in one direction only, to effect a registering displacement thereof.

5. A popularity meter for phonographs comprising a shaft, a brake for preventing movement of the shaft in registering direction and permitting forcible movement thereof in the opposite direction, a plurality of registering discs, each rotatably mounted on said shaft, individual friction means associated with each disc for providing friction for the disc exclusively with the shaft, means on said shaft maintaining each disc out of frictional contact with adjacent discs, an actuating member arranged to be brought into selecting position in alignment with each disc, means for moving said member in a path in the form of a closed figure during a part only of which it frictionally engages the aligned disc, and while moving in one direction only, to effect a registering displacement thereof, a pair of stops for each disc arranged to arrest the discs in zero and fully actuated positions, and a handle on said shaft for rotating it against the action of said brake for returning the discs to zero position as a result of the individual friction between each disc and the shaft.

6. A popularity meter for phonographs comprising a shaft, a brake for preventing movement of the shaft in registering direction and permitting forcible movement thereof in the opposite direction, a plurality of registering discs, each rotatably mounted on said shaft, individual friction means associated with each disc for providing friction for the disc exclusively with the shaft, means on said shaft maintaining each disc out of frictional contact with adjacent discs, an actuating member arranged to be brought into selecting position in alignment with each disc, means for moving said member in a path in the form of a closed figure during a part only of which it frictionally engages the aligned disc while moving in one direction only, to effect a registering displacement thereof, a pair of stops, one of which is resilient, for each disc arranged to arrest the discs in zero and fully actuated positions, and a handle on said shaft for rotating it against the action of said brake for returning the discs to zero position.

7. A popularity meter for phonographs comprising a plurality of discs, each corresponding to an individual record, friction means holding the discs in individual positions, actuating member movable into alignment with each disc, an element carrying said member, a second pivotally mounted element pivotally connected to the first element, stop means for limiting relative movement between said elements, yieldable means for holding the second element in a normal and an actuated position, means for oscillating the first element in one direction and in the opposite direction, the movement in the first direction effecting an independent movement of first element relative to the second element and thereafter joint movement of both elements to bring the second element into actuated position, and the opposite movement of the first element effecting an independent movement of the first element relative to the second element to bring the actuating member into operating engagement with the aligning disc and thereafter effecting a joint movement of both elements to bring the second element to normal position and effect the withdrawal of the actuating member from the aligned disc.

8. A popularity meter for phonographs, comprising a plurality of discs, each corresponding to an individual record, friction means holding the discs in individual positions, actuating means movable into alignment with each disc, a pivotally mounted element, yielding means tending to hold said element in normal and actuated positions, a second element pivotally connected to the first element, contact means on said elements located to permit a limited movement therebetween, a disc actuating member carried by the second element adjacent its pivotal connection with the first element, means for swinging the second element in one direction whereby it is caused to move independently and thereafter to swing jointly with the first element to bring the latter into actuated position, and means for swinging the second element in the opposite direction to effect independent movement of the second element to establish actuating engagement of the actuating member with the aligned disc and thereafter joint movement of both elements to return the first element to normal position and withdraw the actuating member from the aligned disc.

9. An actuating unit for a phonograph popularity meter, comprising a rocking member movable between a normal and an actuated position, yielding means tending to hold such member in either position, a second member pivotally connected to the first member in spaced relation to its rocking axis, stop means on said members to limit their relative movement, a disc actuating element carried by the second member adjacent its pivotal connection with the first member, means biassing the second frame in one direction so as to locate the first member in its normal position, and power means for actuating the second frame in the opposite direction, said stop means and said yielding means cooperating so that in each actuation of the second, results in an independent movement of the second member and a subsequent joint movement of both members, whereby the disc actuating element is caused to execute a closed path.

References Cited in the file of this patent

UNITED STATES PATENTS

| | | |
|---|---|---|
| 342,737 | Dougherty | May 25, 1886 |
| 1,194,640 | Kerr | Aug. 15, 1918 |
| 1,378,720 | Raeling | May 17, 1921 |
| 1,391,986 | Smith | Sept. 27, 1921 |
| 1,598,015 | Rosenberger | Aug. 21, 1926 |
| 1,895,189 | Hoffmeister | Jan. 24, 1933 |
| 1,981,231 | Grant | Nov. 20, 1934 |
| 2,002,236 | Wilcox | May 21, 1935 |
| 2,318,526 | Rockola | May 4, 1943 |
| 2,368,761 | Hogan | Feb. 6, 1945 |
| 2,550,950 | Young | May 1, 1951 |
| 2,554,942 | Dobrowsky | May 29, 1951 |